United States Patent
Goseling et al.

(10) Patent No.: US 10,219,118 B2
(45) Date of Patent: Feb. 26, 2019

(54) METHOD AND TRANSMISSION NODE FOR PROVIDING DATA PACKETS TO A PLURALITY OF RECEIVERS USING NETWORK CODING

(71) Applicants: Koninklijke KPN N.V., Rotterdam (NL); Nederlandse Organisatie Voor Toegepast-Natuurwetenschappelijk Onderzoek TNO, The Hague (NL); University of Twente, Enschede (NL)

(72) Inventors: Jasper Goseling, Enschede (NL); Ljupco Jorguseski, Rijswijk (NL)

(73) Assignees: KONINKLIJKE KPN N.V., Rotterdam (NL); NEDERLANDSE ORGANISATE VOOR TOEGEPAST-NATUURWETENSCHAPPELIJK ONDERZOEK TNO, Den Haag (NL); UNIVERSITY OF TWENTE, Enschede (NL)

( * ) Notice: Subject to any disclaimer, the term of this patent is extended or adjusted under 35 U.S.C. 154(b) by 93 days.

(21) Appl. No.: 15/379,307

(22) Filed: Dec. 14, 2016

(65) Prior Publication Data

US 2017/0188203 A1 Jun. 29, 2017

(30) Foreign Application Priority Data

Dec. 29, 2015 (EP) .................................... 15202936

(51) Int. Cl.
*H04W 4/00* (2018.01)
*H04W 4/06* (2009.01)
(Continued)

(52) U.S. Cl.
CPC ............. *H04W 4/06* (2013.01); *H04L 1/0009* (2013.01); *H04L 1/0076* (2013.01); *H04W 28/065* (2013.01); *H04W 84/042* (2013.01)

(58) Field of Classification Search
CPC .... H04W 28/065; H04W 4/06; H04W 84/042
See application file for complete search history.

(56) References Cited

U.S. PATENT DOCUMENTS

| 6,278,716 B1 | 8/2001 | Rubenstein et al. |
| 2014/0317222 A1* | 10/2014 | Li ....................... H04L 67/1097 709/213 |
| 2017/0237652 A1* | 8/2017 | Calmon ................. H04L 45/24 370/315 |

FOREIGN PATENT DOCUMENTS

| WO | WO 2009/131979 A2 | 10/2009 |
| WO | WO 2010/005181 A2 | 1/2010 |

(Continued)

OTHER PUBLICATIONS

Bouras, C. et al., "Enhancing Reliable Mobile Multicasting with RaptorQ FEC," *2012 IEEE Symposium on Computers and Communications (ISCC)*, pp. 82-87 (Jul. 1, 2012).

(Continued)

*Primary Examiner* — Minh Trang T Nguyen
(74) *Attorney, Agent, or Firm* — Hamilton, Brook, Smith & Reynolds, P.C.

(57) ABSTRACT

The disclosure relates to a transmission node and a method for wirelessly providing a number of data packets to a plurality of receivers in a cell of a transmission node of a cellular telecommunications system. The method comprises the steps of storing a number of network coded data packets at the transmission node and cyclically transmitting the stored network coded data packets from the transmission node to the plurality of receivers. The number of transmitted network coded data packets in a cycle is at least equal to the number of data packets to be provided to each receiver of the plurality of receivers and each network coded data packet is a linear combination of two or more data packets to be provided to each receiver.

17 Claims, 7 Drawing Sheets

(51) Int. Cl.
  H04W 28/06 (2009.01)
  H04L 1/00 (2006.01)
  H04W 84/04 (2009.01)

(56) References Cited

FOREIGN PATENT DOCUMENTS

WO  WO 2010/005181 A3  1/2010
WO  WO 2017/103044 A1  6/2017

OTHER PUBLICATIONS

European Search Report for European Application No. EP 15 20 2936, titled: Method and Transmission Node for Providing Data Packets to a Plurality of Receivers Using Network Coding, dated Jun. 15, 2016.
3GPP TSG-RAN WG2 #89bis Bratislava, Slovakia, Apr. 20-24, 2015.
Cohen, R., et al., "Cross-Layer Hybrid FEC/ARQ Reliable Multicast with Adaptive Modulation and Coding in Broadband Wireless Networks," http://wimnet.ee.columbia.edu/wp-content/uploads/2013/03/RM-AMC_ToN.pdf, *Department of Computer Science*, Technion, Israel Institute of Technology Haifa 32000, Israel, pp. 1-14 (2013).
Huawei, HiSilicon, "Comparison of Unicast and SC-PTM on radio efficiency," 3GPP TSG-RAN WG2 #89bis, R2-151395, pp. 1-3 (2015).
Huawei, HiSilicon, "Support of single-cell point-to-multipoint transmission in LTE," *3GPP Working Procedures*, Article 39; and 3GPP TR 21.900 (2015).
Luby, et al., "Forward Error Correction (FEC) Building Block," *Experimental, The Internet Society*, pp. 1-16 (2002).
Luby, et al., "The Use of Forward Error Correction (FEC) in Reliable Multicast," *The Internet Society*, pp. 1-18 (2002).
Luby, M., et al., "Raptor Forward Error Correction Schemefor Object Delivery," [http://www.researchgate.net/publication/241686104]*Research Gate*, pp. 1-47 (2007).
Technical Report, 3rd Generation Partnership Project; Technical Specification Group Radio Access Network; Evolved Universal Terrestrial Radio Access (E-UTRA); Study on single-cell point-to-multipoint transmission for E-UTRA, 3GPP TR 36.890 (Release 13), pp. 1-31 (2015).
Thai, T. T., et al., "Joint on-the-fly network coding/video quality adaptation for real-ti 1ne delivery," *Signal Processing: Image Communication 29*, pp. 449-461 (2014).

* cited by examiner

METHOD AND TRANSMISSION NODE FOR PROVIDING DATA PACKETS TO A PLURALITY OF RECEIVERS USING NETWORK CODING

RELATED APPLICATION

This application claims priority under 35 U.S.C. § 119 or 365 to European Application No. 15202936.9, filed Dec. 29, 2015. The entire teachings of the above application are incorporated herein by reference.

TECHNICAL FIELD

The invention relates to a method and transmission node for providing data packets to a plurality of receivers. In particular, the invention relates to a method and transmission node for wirelessly providing a number of data packets to a plurality of receivers using network coding.

BACKGROUND

Recent developments in 3GPP standardization relate to Long Term Evolution (LTE) and Long Term Evolution Advanced (LTE Advanced) telecommunications networks and devices. LTE and LTE Advanced, also known as the 4G (i.e. fourth generation) mobile communications standard, is a standard for wireless communication of high-speed data for mobile phones and data terminals. It is a successor of GSM/EDGE (also known as 2G or 2.5G) and UMTS/HSPA (also known as 3G) network technologies, increasing the capacity and speed using a different radio interface together with evolutions and improvements in the radio access network and the core network.

Single-Cell Point-to-Multipoint Transmission (SC-PTM) is a transmission technique currently under development in 3GPP standardization. The main idea in SC-PTM is that in some situations it is beneficial to be able to multicast the data packets in one cell from one base station to multiple receivers that are connected to a cell of the base station. Examples of such a situation include multicasting a specific software update to receivers in the cell, sharing video or data files amongst a group of receivers in the cell, etc.

Some proposals in 3GPP standardization specify that, in SC-PTM scenarios, the UEs receiving and having received the multicast data packets may provide feedback to the base station. One such proposal is 3GPP TSG-RAN WG2 #89bis, R2-151395, titled "Comparison of Unicast and SC-PTM on radio efficiency". The proposed feedback may involve channel state information that may be used by the base station to adapt the modulation and coding scheme (MCS) of the transmitted multicast data packets. Furthermore, the UE feedback may involve positive acknowledgements (ACKs) and negative acknowledgements (NACKs) relating to the successful respectively unsuccessful receipt of the data packets from the multicast by each of the receivers in the cell.

The positive and negative acknowledgements of each of the receivers consume a significant amount of uplink resources. Hence, there is a need in the art to reduce the number of acknowledgements from the receiver.

SUMMARY

In one aspect, the present disclosure presents a method for wirelessly providing a number of data packets to a plurality of receivers in a cell of a transmission node of a cellular telecommunications system. A number of network coded data packets is stored at the transmission node and the transmission node cyclically transmits (e.g. as a multicast) the stored network coded data packets from the transmission node to the plurality of receivers. The number of transmitted network coded data packets in a cycle is at least equal to the number of data packets to be provided to each receiver of the plurality of receivers. Each network coded data packet is a linear combination of two or more data packets to be provided to each receiver.

Another aspect of the present disclosure pertains to a transmission node for wirelessly providing a number of data packets to a plurality of receivers in a cell of a cellular communications network. The transmission node comprises storage means storing a number of network coded data packets at the transmission node and processing means configured for cyclically transmitting the stored network coded data packets to the plurality of receivers. Again, the number of transmitted network coded data packets in a cycle is at least equal to the number of data packets to be provided to each receiver of the plurality of receivers and wherein each network coded data packet is a linear combination of two or more data packets to be provided to each receiver.

Yet another aspect of the disclosure involves a telecommunications network comprising a first transmission node defining a first cell and a second transmission node defining a second cell. The first transmission node stores a first set comprising a number of network coded data packets for the first cell and is configured for cyclically transmitting the stored network coded data packets of the first set to a plurality of receivers in the first cell. Likewise, the second transmission node stores a second set comprising a number of network coded data packets for the second cell and is configured for cyclically transmitting the stored network coded data packets of the second set to a plurality of receivers in the second cell. At least one (and optionally all) of the network coded data packets in the first set is (are) different from each of the network coded data packets in the second set.

It should be noted that the number of data packets to be provided to the receivers may constitute a set of data packets, also referred to as source block, from which the network coded data packets are generated. A number of such source blocks may constitute a file.

The applicants have realized that a key concept of future generations of telecommunications networks is the storage of content (e.g. a file) closer to the users, i.e. to the potential receivers. The storage of the data packets (in contrast to discarding the data packets after transmission) enables the transmission node to cyclically transmit data packets. The storage of the data packets at the transmission node omits the need for repeatedly transmitting the same data packet in the core network.

The cyclical transmission omits the need for the receiver(s) to transmit feedback to the transmission node in order to receive a repair packet. If the receiver misses a data packet, the receiver may simply wait until the transmission node transmits the missing data packet again in a next cycle. In order to reduce the chance that the receiver indeed needs to wait for a complete cycle if a data packet is missed, the stored and cyclically transmitted data packets are network coded data packets. The network coded data packets are linear combinations of at least two data packets to be provided to the receiver. Hence, the receiver may be able to resolve a missing data packet from the network coded data packet without waiting for a complete cycle.

Network coding comprises making a linear combination of (at least the payload of) two or more data packets (e.g. via a bit-wise XOR operation of the two or more data packets), resulting in a network coded data packet. A single network-coded data packet thus represents a single linear combination of the two or more data packets. Note that different linear combinations, and thus different network coded data packets, may be made from a same set of two or more data packets. Also, a linear combination of the two or more data packets of a given (same) size may result in a network-coded data packet of that given size. Overhead information (e.g. signalling information stored as overhead bits) may additionally be included to indicate or signal the linear combination made in producing the network coded data packet.

In general, a network coded packet C can be expressed as a linear combination of two or more original data packets P:

$$C_n = a_{n1}P_1 + a_{n2}P_2 + a_{n3}P_3 + \ldots$$

Network coded data packets C are different if the linear combinations are different, i.e. if either the coding coefficients are different or the involved data packets P are different. Preferably, the vectors of coding coefficients of two or more network coded data packets C are linearly independent. This facilitates resolving the original data packets P from the network coded data packets C at e.g. a user device.

By applying network decoding on a sufficient number of linearly independent network coded data packets C, the data packets P comprised in the linear combinations represented in the network coded data packets may be resolved.

In this disclosure, a data packet may comprise any block (e.g. an integer number of bits or bytes) of payload data. A data packet typically also has additional overhead (bits or bytes), e.g. header and/or trailer bits, for the purpose of transporting the payload data. Examples of overhead comprise an indication of the data packet (e.g. a packet sequence number) and/or payload destination, of a (logical) channel, of a data packet and/or a payload length and/or an error check (e.g. CRC). A data packet in this disclosure thus comprises e.g. an Internet Protocol (IPv4, IPv6) datagram, possibly with additional overhead such as GTP overhead for tunnelling the IP packet through part of the telecommunications network (e.g. from a gateway (S-GW) to a base station (eNB)), an RLC PDU and a Transport Block as e.g. used on a wireless (radio) connection between a base station (eNB) and a user device (UE).

Performing network coding on two or more data packets is to be understood as performing network coding on at least the payload data in each of the two or more data packets, and not necessarily on signalling bits or bytes in these data packets.

It should be noted that the transmission node may send control information to the receivers assisting the receivers in resolving data packets from the network coded data packets. For example, the control information may comprise at least one of the code used for network coding, the number of source blocks (if the content is divided into source blocks) and of the number of data packets of the content. From this information, a receiver may derive other parameters for resolving the data packets from the received network coded data packets.

In one embodiment the method comprises the step of selecting the two or more data packets for the linear combination of each of the network coded data packet such that the linear combination of each network coded data packet is independent from the linear combination of each of the other network coded data packets. The embodiment increases the probability that a receiver receives useful network coded data packets, i.e. network coded data packets from which the receiver may resolve further data packets of the data packets to be provided. The selection of the coding coefficients and/or the data packets for the linear combinations may be a random selection. However, in one specific embodiment, the selection comprises deterministically selecting at least one of (i) the at least two data packets and (ii) the corresponding coding coefficients of each linear combination of the two or more data packets of each linear combination is a deterministic selection. Deterministic selections are computationally less complex than random selections and may obtain the same effect of optimizing the probability that a network coded data packet is a useful packet. One embodiment of a network coded data packet wherein a deterministic selection of data packets of the linear combination are used comprises a Raptor coded data packet. In a Raptor coded data packet, the linear combination of data packets is carefully constructed.

In one embodiment, the number of stored and cyclically transmitted network coded data packets exceeds the number of data packets to be provided to the plurality of receivers. The more network coded data packets are included in the cycle, the greater the probability that a receiver does not need to stay tuned to the cyclic transmission for the complete cycle. As a consequence, the transmission node may stop the cyclical transmission of the network coded data packet at an earlier point in time if no further receivers are interested in the content. A receiver that has received all network coded data packets needed to resolve the data packets may stop listening to the transmission cycle. In one embodiment, the number of stored and cyclically transmitted data packets exceeds the number of data packets by a quantity related to a data loss probability in the cell. The data loss probability in the cell may be estimated by the transmission node and provides for a measure to determine the excess quantity of network coded data packets needed to optimize the reception at the receivers. If the data loss probability in a cell is (temporarily) high, the additional number of network coded data packets in the cycle may be higher than for a low data loss probability. The data loss probability may be a multicast data loss probability.

In one disclosed embodiment, the cellular telecommunications system comprises a first cell and a second cell. A first set comprising a number of network coded data packets is stored for the first cell and cyclically transmitted to a plurality of receivers in the first cell. Similarly, a second set comprising a number of network coded data packets is stored for the second cell and cyclically transmitted to a plurality of receivers in the second cell. At least one of the network coded data packets of the first set is different from each of the network coded data packets of the second set. The first cell and the second cell may be neighbouring cells. The sets of network coded data packets are generated from the same set of data packets to be provided to the receivers. The number of linear combinations that may be made from the source block of the data packets to be provided to the receivers is limited, i.e. the number of network coded data packets that can be generated from the data packets to be provided to the receivers is limited. A partial overlap between the transmitted network coded data packets increases the number of network coded data packets that can be included in the transmission cycle. On the other hand, the smaller the overlap of network coded data packets used for providing the data packets to a receiver transmitted in the first cell and the second cell, the greater the probability that a receiver receives useful network coded data packets when moving from the first cell to the second cell (handover). In such an embodiment, the first set and the second set may be disjoint sets of network coded data packets. A operator decision about the extent of the overlap, if any, depends on the local and temporal conditions in the network.

In one embodiment, the first cell is associated with a first cell identifier and the second cell is associated with a second cell identifier, different from the first cell identifier. The network coded data packets of the first set are generated using the first cell identifier and the network coded data packets of the second set are generated using the second cell identifier. The use of the cell identifiers provides for a practical way of organizing disjoint sets of network coded data packets for transmission from a base station, such that e.g. neighboring cells use different network coded data packets in the transmission cycle. A further advantage of using a cell identifier for obtaining the network coded data packets is that these identifiers are already typically known to the receiver from a system information broadcast in the cell and received and processed by the receiver upon entering the cell. Hence, network coded data packets do not need to contain this information in the header as signaling information. To identify the linear combination of data packets in the network coded data packet, the network coded data packet need only contain sequence information, e.g. a sequence number of the network coded data packet in the transmission cycle. From the sequence information, an identifier (e.g. the ESI, see below) can be derived that specifies the linear combination of data packets in the network coded data packet.

A particularly advantageous embodiment pertains to the use of the physical cell identifier PCID as the first/second cell identifier, since the length of this identifier is suitable for obtaining a sufficient number of network coded data packets for a cell, i.e., it is short enough, while preserving the property that neighboring cells have different a PCID. For example, in LTE a 504 unique physical-layer cell identities are defined based on the downlink primary and secondary synchronization signals as defined in TS 36.211 v12.7.0. In UMTS the PCID is represented by the 512 primary scrambling codes as defined in TS 25.213 v12.0.0.

One aspect of the disclosure pertains to a receiver configured for receiving at least one network coded data packet from a transmission node, wherein the network coded data packet comprises a linear combination of at least two or more data packets to be provided to the receiver. The receiver comprises a processor configured to:

obtain a cell identifier (e.g. a physical cell identifier PCID) of a cell of the transmission node;

obtain a sequence information, e.g. a sequence number of a network coded data packet in a transmission cycle of network coded data packets; and determining the linear combination of the two or more data packets using the cell identifier and the sequence information. From the cell identifier and the sequence information, the receiver can determine the linear combination of data packets in the network coded data packet, thereby increasing signaling efficiency.

As will be appreciated by one skilled in the art, aspects of the present invention may be embodied as a system, method or computer program product. Accordingly, aspects of the present invention may take the form of an entirely hardware embodiment, a software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid-state drive, a random access memory (RAM), a non-volatile memory device, a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless (using electromagnetic and/or optical radiation), wired, optical fiber, cable, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the functions noted in the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the invention relates to all possible combinations of features recited in the claims.

BRIEF DESCRIPTION OF THE DRAWINGS

Aspects of the invention will be explained in greater detail by reference to exemplary embodiments shown in the drawings, in which.

DETAILED DESCRIPTION

Figure 1:
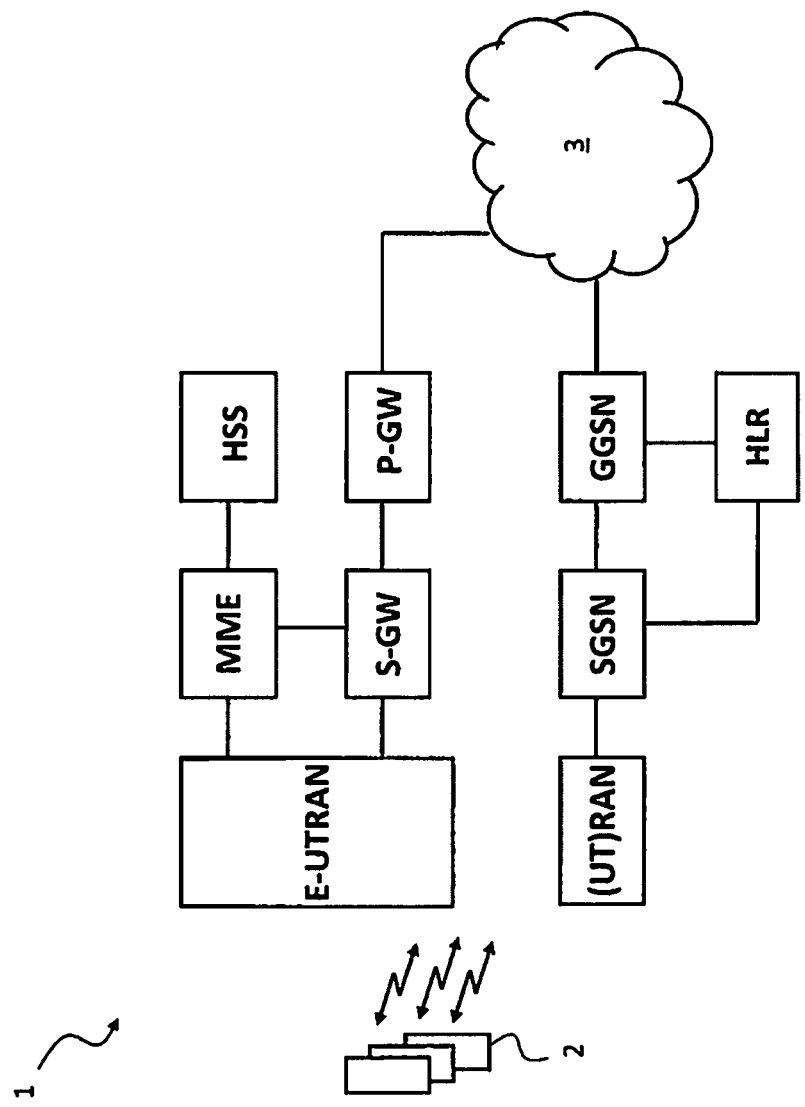
FIG. 1 is a schematic illustration of three generations of telecommunications networks.

FIG. 1 shows a schematic illustration of a cellular telecommunications system 1. The telecommunications system 1 comprises a cellular radio access network system (also indicated as E-UTRAN or (UT)RAN in FIG. 1) and a core network system containing various elements or nodes as described in further detail below.

In the telecommunications system of FIG. 1, three generations of networks are schematically depicted together for purposes of brevity. A more detailed description of the architecture and overview can be found in 3GPP Technical Specification TS 23.002 'Network Architecture' which is included in the present application by reference in its entirety.

The lower branch of FIG. 1 represents a GSM/GPRS or UMTS network.

For a GSM/GPRS network, a radio access network (RAN) system comprises a plurality of nodes, including base stations (combination of a BSC and a BTS), not shown individually in FIG. 1. The core network system comprises a Gateway GPRS Support Node (GGSN), a Serving GPRS Support Node (SGSN, for GPRS) or Mobile Switching Centre (MSC, for GSM, not shown in FIG. 1) and a Home Location Register (HLR). The HLR contains subscription information for user devices 2, e.g. mobile stations MS.

For a UMTS radio access network (UTRAN), the radio access network system also comprises a Radio Network Controller (RNC) connected to a plurality of base stations (NodeBs), also not shown individually in FIG. 1. In the core network system, the GGSN and the SGSN/MSC are connected to the HLR that contains subscription information of the user devices 2, e.g. user equipment UE.

The upper branch of the telecommunications system in FIG. 1 represents a next generation network, commonly indicated as Long Term Evolution (LTE) system or Evolved Packet System (EPS).

The radio access network system, indicated as E-UTRAN, comprises base stations (evolved NodeBs, eNodeBs or eNBs), not shown individually in FIG. 1, providing cellular wireless access for a user device 2, e.g. a user equipment UE. The core network system comprises a PDN Gateway (P-GW) and a Serving Gateway (S-GW). The E-UTRAN of the EPS is connected to the S-GW via a packet network. The S-GW is connected to a Home Subscriber Server HSS and a Mobility Management Entity MME for signalling purposes. The HSS includes a subscription profile repository SPR for user devices 2.

For GPRS, UMTS and LTE systems, the core network system is generally connected to a further packet network 3, e.g. the internet.

Further information of the general architecture of a EPS network can be found in 3GPP Technical Specification TS 23.401 'GPRS enhancements for Evolved Universal Terrestrial Radio Access Network (E-UTRAN) access'.

Figure 2:
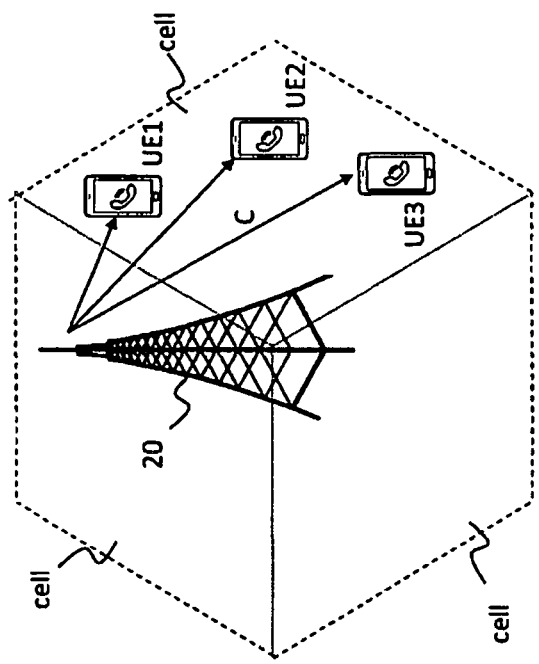
FIG. 2 is a schematic illustration of a transmission node defining a cell for a plurality of receivers according to a disclosed embodiment.

FIG. 2 is a schematic illustration of a transmission node 20, e.g. a base station, in a telecommunications network 1 as depicted in FIG. 1. The base station 20 comprises a computer system and a transmitter/receiver. Details of the base station will be discussed with reference to FIGS. 3 and 7.

The base station 20 defines a plurality of cells. Three user equipment devices UE1, UE2 and UE3 are shown in a cell.

Telecommunications network 1 may have data, e.g. a file, for the UEs. Base station 20 provides the data to the UEs using Single-Cell Point To Multipoint Transmission (SC-PTM) by means of network coded data packets C. The data may relate to various types of services, e.g. voice, video or file transfer. SC-PTM provides the network coded data packets C to the UEs using multicast transmission. The multicast transmission is shown by the arrows from the base station 20 to UE1, UE2 and UE3. It should be appreciated that cell 21 may contain more UEs and that base station 20 may perform the same or a different SC-PTM in other cells. Other transmissions than multicast transmission, e.g. unicast transmissions, may also be performed using the method as disclosed herein.

Figure 3:
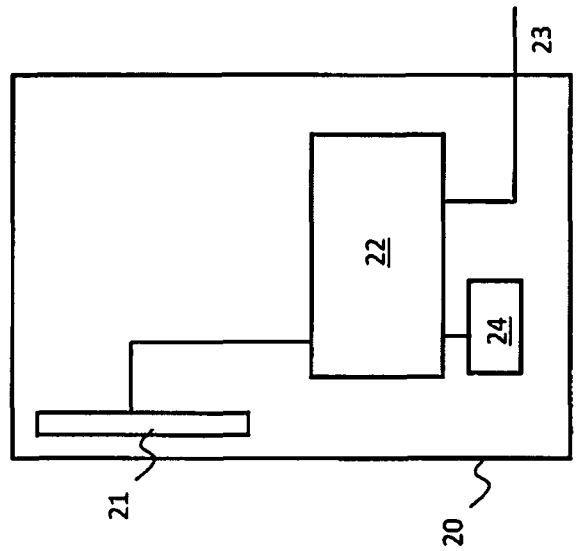
FIG. 3 is a schematic illustration of a transmission node according to an embodiment of the invention.

FIG. 3 depicts a schematic illustration of an embodiment of base station 20 that may be part of a radio access network as shown in FIG. 1. Base station 20 may e.g. comprise a fourth generation eNodeB or future generation base station. The base station 20 has a transceiver component 21 for radio communication with user equipment devices UE1, UE2 and UE3. The base station 20 also has a processor 22 determining operation of the base station. Generally, processor 22 will run software and/or comprise dedicated hardware to perform the functions as disclosed herein, such as the cyclical transmission of network coded data packets C. Base station 20 has a connection 23 with the core network of the telecommunications network 1 upstream from the radio access network as shown in FIG. 1. Base station 20 may receive (sets of) data packets P over connection 23 to be provided to the user equipment devices UE1, UE2, UE3. Processor 22 may generate network coded data packets C and store these in storage 24. Alternatively, base station 20 receives network coded data packets over connection 23 and store these in storage 24 of base station 20. Storage 24 may be located in the core network of telecommunications network 1, although this would result in repeated transmissions of the same network coded data packet C to the base station 20.

Figure 4:
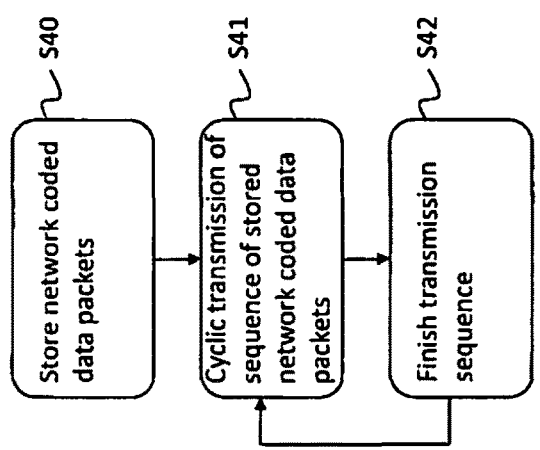
FIG. 4 is a flow chart illustrating steps of a transmission method according to an embodiment of the invention.

FIG. 4 is a flow chart illustrating some steps of the disclosed method of providing data packets from base station 20 to one or more user equipment devices UE1, UE2, UE3.

Step S40 comprises storing network coded data packets C at the base station 20. These network coded data packets are e.g. stored in storage 24 of the base station 20. The stored network coded data packets C correspond to a number of data packets P to be provided to the user equipment devices.

Once the network coded data packets C are stored, cyclical transmission of network coded data packets from base station 20 in the cell is facilitated. Cyclical transmission of network coded data packets involves transmitting a sequence of network coded data packets in a certain order, thereby defining a cycle. When the final network coded data packet of the sequence has been transmitted, restart transmission of the sequence again. Cyclical transmission of the network coded data packets of the sequence is shown in steps S41 and S42 of FIG. 4.

The number n of transmitted network coded data packets C in a cycle is at least equal to the number of data packets P to be provided to each user equipment device UE1, UE2, UE3 of the plurality of user equipment devices. Each network coded data packet C is a linear combination of two or more data packets P to be provided to each receiver.

The two or more data packets P for the linear combination of each of the network coded data packet C may be selected such that the linear combination of each network coded data packet Ci is independent from the linear combination of each of the other network coded data packets Cj. The embodiment increases the probability that a user equipment device receives useful network coded data packets, i.e. network coded data packets from which the user equipment device may resolve further data packets P of the data packets to be provided.

It should be noted that further communications may exist for the time diagram. For example, the transmission node may send control information to the receivers assisting the receivers in resolving data packets P from the network coded data packets C.

Figure 5:
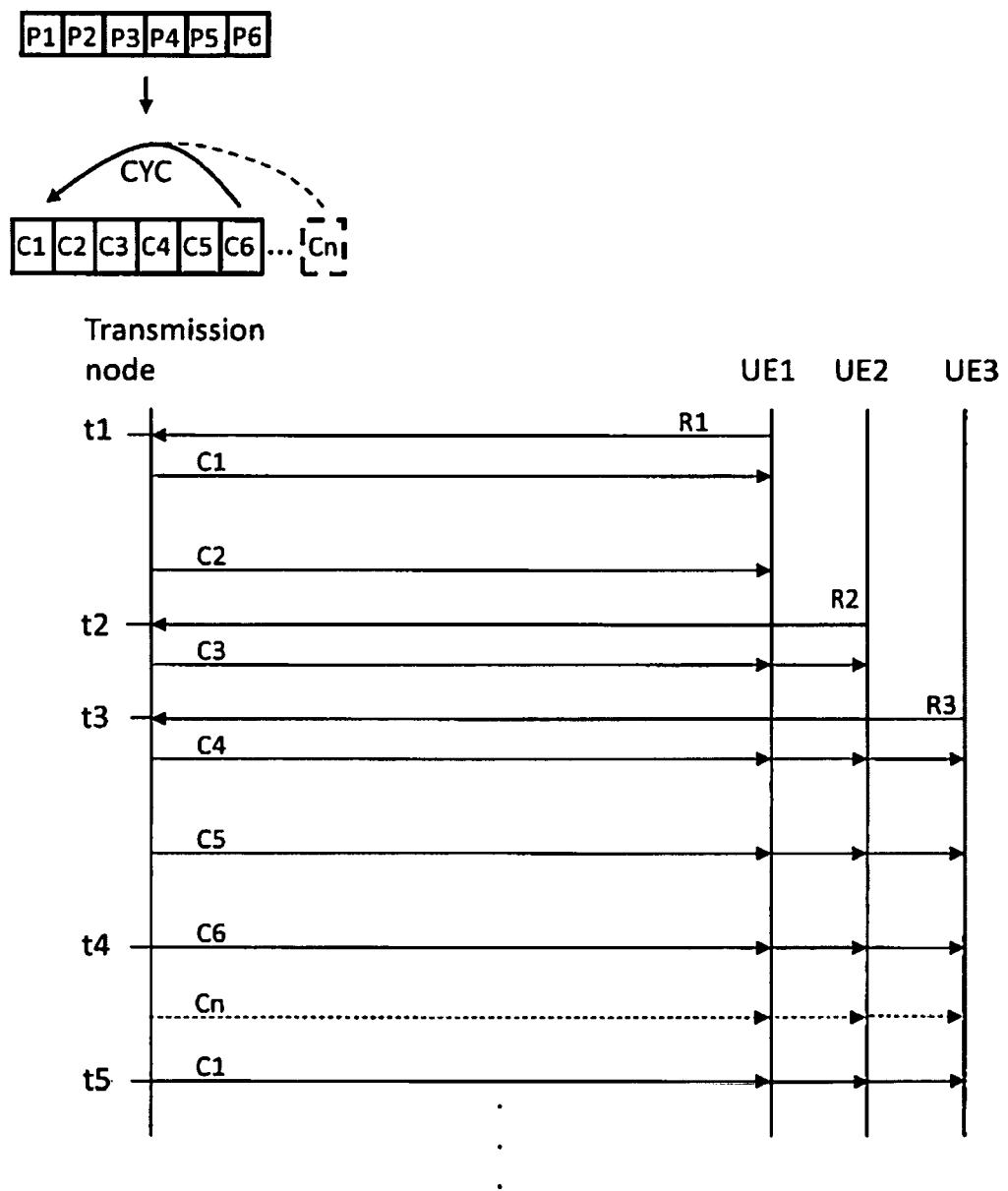
FIG. 5 is a time diagram illustrating a cyclic transmission method of network coded data packets according to an embodiment of the invention.

FIG. 5 is a time diagram illustrating providing a number of data packets P1-P6 from base station 20 to user equipment devices UE1, UE2 and UE3 by means of cyclical transmission of network coded data packets C1-Cn. The transmissions may be unicast transmission. The transmission may also be a multicast transmission, wherein the arrows in FIG. 5 mean that the user equipment devices UE1, UE2, UE3 are tuned to the multicast.

In one embodiment, the number n of network coded data packets C equals the number of data packets P to be provided to the user equipment devices UE1, UE2, UE3 (i.e. n=6 in the present case). In another embodiment, the number n of network coded data packets C exceeds the number of data packets P to be provided to user equipment devices UE1, UE2, UE3. The more network coded data packets are included in the cycle, the greater the probability that a receiver does not need to stay tuned to the cyclic transmission for the complete cycle. However, if a user equipment device misses too many network coded data packets C, the user equipment might have to stay tuned to the transmission cycle for more than one cycle.

In the time diagram, UE1 requests (R1) transmission of data from a transmission node at a certain point in time t1. A set of the data comprises data packets P1-P6. At said point in time, UE2 and UE3 have not yet requested transmission of the data, i.e. the requests for data may be asynchronous. The network may provide control information to UE1 assisting in resolving data packets P from the network coded data packets C to be received next.

Transmission node 20 may start transmission of network coded data packets C1-C6, by first transmitting C1, then C2, then C3, then C4, then C5 and then C6 as indicated. At a point in time t2 between the transmissions of C2 and C3, UE2 has requested (R2) the same data and at t3 between the transmission of C3 and C4, UE3 has requested (R3) the same data.

If the number n of network coded data packets P equals the number of data packets P to be provided to the user equipment devices UE1, UE2 and UE3, the cycle CYC is completed at t4. At t4, as assuming that all network coded data packets have been received correctly, UE1 has received all network coded data packets C1-C6, UE2 has received network coded data packets C3-C6 and UE3 has received network coded data packets C4-C6. Hence, UE1 is able to resolve data packets P1-P6 from the received network coded data packets C1-C6. UE2 and UE3 are not yet able to resolve the data packets P1-P6.

After having transmitted C6 at t4, the transmission node will start a new cycle at t5 by transmitting C1 again, as shown in FIG. 5, followed by C2 etc.

Optionally, as shown by the dashed block in FIG. 5, the number n of network coded data packets exceeds the number of data packets P1-P6 that should be provided to the user equipment devices UE1, UE2, UE3. The additional network coded data packets C in the extended cycle are new linear combinations of data packets P that do not exist in the original, minimal, cycle. In FIG. 5, a transmission of such additional network coded data packet C is shown by Cn. It should be appreciated that multiple network coded data packets C may be added to the minimal cycle, i.e. n>6 in this case. As such, the transmission cycle of the transmission node is extended with new useful network coded data packets. Adding additional network coded data packets C to the cycle is beneficial when some network coded data packets C of a cycle are not correctly received by the user equipment devices. For example, if UE1 would have missed network coded data packet C5 for some reason, it is not necessary for UE1 to wait for the renewed transmission of C5 in the next cycle. Instead, the additional network coded data packet, e.g. C7 (if n=7) would still be sufficient to resolve all data packets P1-P6 from the transmissions of network coded data packets in one cycle.

The number of additional network coded data packets C that are added to the cycle may be dependent on a data loss probability in the cell of the transmission node. If the data loss probability in a cell is (temporarily) high, the additional number of network coded data packets in the cycle may be higher than for a low data loss probability. The data loss probability may be multicast data loss probability.

A multicast data loss probability in the cell can be derived from the individual data loss probability at the multicast receivers UE1, UE2, UE3 defined as the ratio between the number of incorrect multicast packets and the total number of multicast packets received at a particular receiver served in the given cell. This ratio can be evaluated for the individual multicast receivers e.g. within a particular time interval, from the beginning of the multicast session, after receiving a certain total number of multicast packets etc. Then, from these individual data loss probabilities per multicast receiver the overall cell multicast data loss probability can be derived as e.g. the worst case multicast data loss probability among all of the multicast receivers in the given cell, or an average of the multicast receivers in the given cell, or as percentile from the individual multicast data loss probabilities. Note that the individual multicast data loss probabilities per multicast receiver in the cell can be calculated at the individual multicast receivers and reported back to the multicast transmitter.

Obviously, the number of network coded data packets C in the cell has an upper limit. Hence, a balance should be found between extending the cycle CYC with additional network coded data packets C to account for missed network coded data packets and the amount of storage used at the transmission node.

Figure 6:
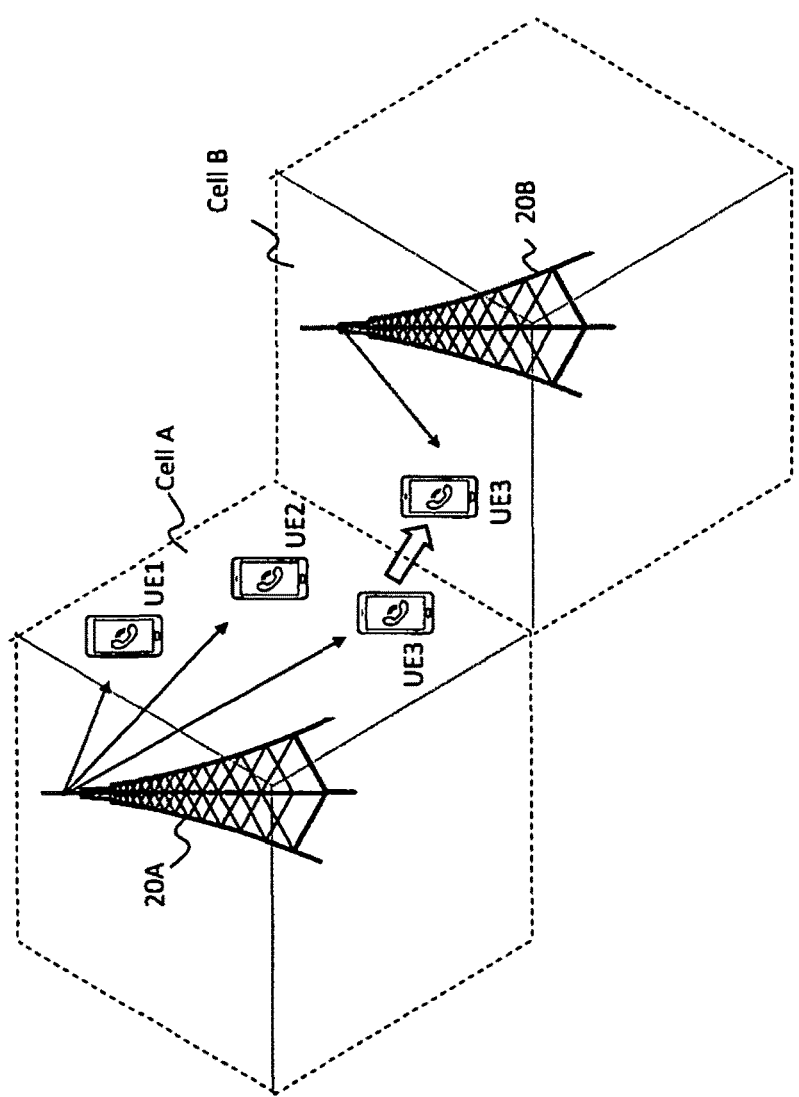
FIG. 6 shows a telecommunications network comprising a first transmission node and a second transmission node transmitting network coded data packets according to an embodiment of the invention.

FIG. 6 is a schematic illustration of neighbouring cells, cell A and cell B, provided by transmission nodes 20A, 20B respectively. User equipment device UE3 moves from cell A to cell B, as indicated by the arrow.

Figure 7:
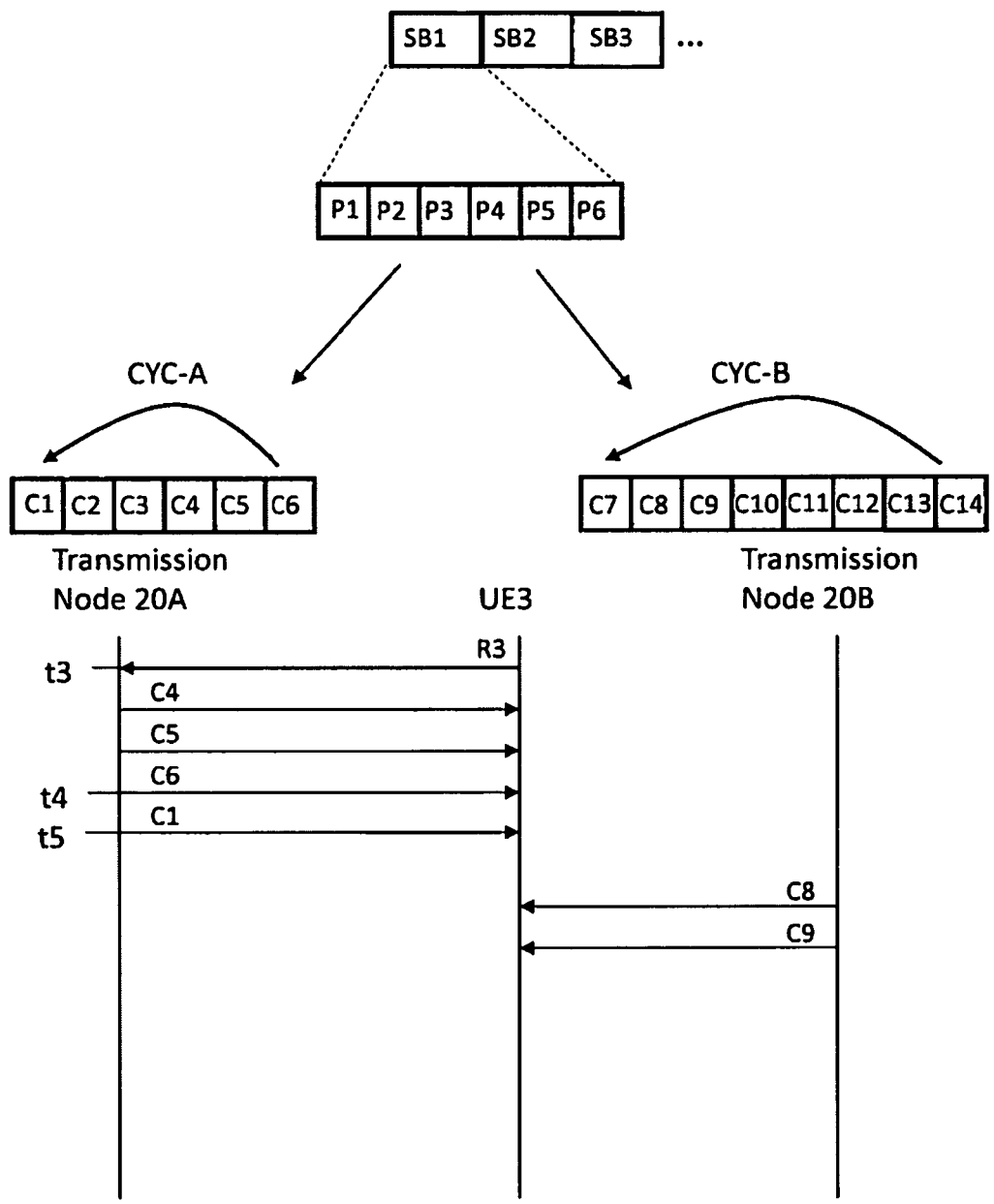
FIG. 7 is a time diagram illustrating cyclic transmission of the first transmission node and the second transmission node as illustrated in FIG. 6.

As shown in FIG. 7, a first set comprising a number of network coded data packets C1-C6 is stored for cell A and cyclically transmitted to a plurality of user equipment devices UE1, UE2, UE3 in the first cell A. Similarly, a second set comprising a number of network coded data packets C7-C14 is stored for cell B and cyclically transmitted to a plurality of receivers, including UE3 after t5, in cell B. Transmissions in cell A and cell B need not be coordinated.

It can be observed from FIG. 7 that transmission node 20A has a transmission cycle CYC-A using the minimum amount of network coded data packets C. Transmission node 20B has a transmission cycle CYC-B containing two additional network coded data packets C13, C14 above the minimum transmission cycle needed for providing six data packets P1-P6 to a receiver. This may be caused by worse radio conditions in cell B.

At least one of the network coded data packets C in cell A is different from each of the network coded data packets transmitted in cell B. The sets of network coded data packets C in cells A and B are generated from the same source block SB1, i.e. the same set of the number of data packets P1-P6 to be provided to the user equipment devices. In FIGS. 6 and 7, all network coded data packets C transmitted in cell A are assumed to be different, i.e. are different linear combinations of data packets of two or more of P1-P6, from the network coded data packets transmitted in cell B.

In FIG. 7, UE3 performs the same operations and receives the same network coded data packets between t3 and t5 as in FIG. 5. After t5, UE3 moves to cell B. The first network coded data packets that UE3 happens to receive are network coded data packets C8 and C9. Since C8, C9 are linear combination of data packets P1-P6 different from any linear combination in network coded data packets C1, C4-C6 already received by UE3, network coded data packets C8 and C9 are a useful for UE3 in resolving data packets.

In FIG. 7, the set of network coded data packets C used in transmission cycles CYC-A and CYC-B are disjoint. This enables that a receiver will always receive useful network coded data packets C when moving between cell A and cell B.

The number of linear combinations that may be made from the source block SB1 of the data packets P1-P6 to be provided to the receivers is limited however. A partial overlap between the network coded data packets in the transmission cycles CYC-A and CYC-B increases the number of network coded data packets C that can be included in the transmission cycle. Hence, dependent on the circumstances, a network operator may decide to have an overlap between the set of network coded data packets C.

If disjoint sets of network coded data packets C for different cells are desired, one way of organizing this is making use of the cell identifier of these cells. The cell identifiers may be used to generate the network coded data packets for a cell. Since the cell identifiers of the cells differ, the network coded data packets generated for a source block will differ and, hence, disjoint sets of network coded data packets C for the cells are obtained. A further advantage of using a cell identifier for obtaining the network coded data packets C is that these identifiers are already typically known to the receiver from a system information broadcast in the cell and received and processed by the receiver upon entering the cell. Hence, network coded data packets C do not need to contain this information in the header as signaling information. To identify the linear combination of data packets in the network coded data packet, the network coded data packet C need only contain a sequence number of the network coded data packet C in the transmission cycle, as will be shown below for a particular implementation.

A particularly advantageous embodiment pertains to the use of the physical cell identifier PCID as the first/second cell identifier, since the length of this identifier is suitable for obtaining a sufficient number of network coded data packets for a cell, i.e., it is short enough, while preserving the property that neighboring cells have different a PCID.

The Cell ID is known to be a concatenation of four parts, viz. the Mobile Country Code (MCC—3 digits), the Mobile Network Code (MNC—2 or 3 digits), the Location Area Code (LAC—16 bits) and the Cell Identity (CI—16 bits). The cell identity CI is unique within a location area. The cell identity may be selected such that neighboring cells do not have the same CI and a particular cell does not have two neighbors with same CI. For example, in LTE the primary and the secondary synchronization codes of the cell are concatenated to form the Physical Cell ID (PCID). There are 3 primary and 168 secondary synchronization codes, so this gives a total of 504 different PCIDs that are in use in current LTE networks.

If disjoints sets of network coded data packets C are used for each of the 504 PCIDs, the number of data packets P in a source block SB s limited. On the other hand, since the PCID is already known to the receivers in the cell, the signaling overhead only consists of sequence information, e.g. the sequence number, see below, resulting in a more efficient signaling overall.

As mentioned above, the two or more data packets P for the linear combination of each of the network coded data packet C may be selected such that the linear combination of each network coded data packet Ci is independent from the linear combination of each of the other network coded data packets Cj. The selection of the coding coefficients a and/or the data packets P for the linear combinations may be a random selection. However, in one specific embodiment, the selection comprises deterministically selecting at least one of (i) the at least two data packets P and (ii) the corresponding coding coefficients a of each linear combination of the two or more data packets of each linear combination is a deterministic selection. Deterministic selections are computationally less complex than random selections and may obtain the same effect of optimizing the probability that a network coded data packet C is a useful packet. One embodiment of a network coded data packet wherein a deterministic selection of data packets of the linear combination are used comprises a Raptor coded data packet. In a Raptor coded data packet, the linear combination of data packets is carefully constructed.

Raptor codes belong to the class of fountain codes, which is a subclass of general network codes. A fountain code provides a means to reliably deliver a block of data, consisting of a sequence of data packets P. All data packets P are assumed to have the same length. The network coded data packets C are weighted combinations of the data packets P. The weights are indicated by the coding coefficients a as discussed above. The main advantage of Raptor codes over other fountain codes is that the complexity of encoding and decoding is linear in terms of the number of data packets. The standard for eMBMS contains suitable mechanisms to signal the applied Raptor code to a UE.

Raptor codes are completely deterministic. Each network coded data packet C is uniquely determined by an encoding symbol index ESI. The ESI identifies the weighted linear combination of data packets P that is contained in the network coded data packet C. The ESI may thus be said to describe the coding coefficients a, e.g. as a 16-bit number, and may be carried in the header of a network coded data packet C. The ESI may specify 'zeros' for coding coefficients of data packets not contained in the linear combination, such that a full sequence of coding coefficients identifies both the weight coefficients of the data packets in the linear combination and the data packets absent in the linear combination.

As described above, in order to keep computational complexity and memory requirements limited, the content may be partitioned into source blocks and network coding may be performed over data packets P of a single source block. The maximum length of a source block (in terms of number of data packets P that it contains; e.g. six data packets P as shown in FIGS. 5 and 7) is a parameter of the code that is used. Each network coded data packet C contains (linear combinations of) data packets P source symbols of only one source block. Therefore, a mechanism is provided to signal to a UE not only the ESI of a network coded data packet C, but also the source block that it is defined over. For a specific fountain code, e.g. Raptor10 or RaptorQ, a maximum number Q of network coded data packets C can be generated. The total number of data packets P of the content is given by S. The number of data packets P in a source block SB is given by B. The number of source blocks N needed to provide the complete content to a receiver in a cell is given by the smallest integer not less than S/B.

As mentioned above, a transmission cycle may be extended with additional, redundant, network coded data packets C. The extension factor is given by f(>1): for B data packets P in the source block SB, f*B network coded data packets C are provided at the transmission node for transmission in the cycle. For example, in FIG. 6, the extension factor f=8/6 for transmission node 20B.

The number of network coded data packets C that is typically stored at the transmission node amounts to R=f*B. However, when the PCID is used for generating the network coded data packets C and there are only 504 PCID's, the maximum value of R is Q/504. Hence, R=min(f*B, Q/504).

The maximum number of data packets P in a source block SB as supported by the code is given by Bmax. Hence, B=min(R/f, Bmax).

The organization of the 504 disjoint sets of transmission cycles for different cells may be done as follows. 504 different sets of ESI's may be created, wherein all sets have R instances: G_1={1, 2, . . . , R}, G_2={R+1, R+2, . . . , 2R}, . . . , G_504={503R+1, 503R+2, . . . , 504R}. The organization involves that each set will be assigned to a different transmission node, e.g. an eNB with Cell ID (for instance) k will cache (for each source block) the encoded symbols with G_k={(k−1)R+1, (k−1)R+2, . . . , kR}. If the content consists of more than B data packets P, the content will be split in several source blocks SB. Each source block SB is coded independently using the same ESIs from G_k (but applied on different data packets).

If the receiver has obtained the cell identifier PCID, the receiver can derive the set G_k of ESI's, since k is derived from the PCID. In one embodiment, each network coded data packet C is transmitted with a sequence number and, accordingly, the receiver can derive the ESI in the set indicated by PCID. The ESI provides the linear combination of data packets P in the network coded data packets C. If the content is partitioned in source blocks SB, the header of the network coded data packet may also contain an identifier of the source block of data packets from which the network coded data packet is generated.

It is appreciated that the difference between R and Q is at least a factor 504, meaning that signaling efficiency is improved. The reduction comes from the fact that a UE, based on the PCID of the cell from which it is receiving a network coded packet C, knows from which set G_k the network coded data packets C are selected. This saves signaling resources in the header of each network coded data packet.

In order to provide some practical numbers, a Raptor 10 code may have Q=65521 (almost $2^{16}=65536$) and Bmax=8192. Suppose that the length of a source symbol is 8082 bytes (the maximum possible size for a PDCP SDU). Suppose, moreover, that f=1.25. In that case, the number of network coded data packets at an eNB is R~=130 (Q/504), which may be approximated as 128. This means that an ESI needs to be represented with $\log_2(128)=7$ bits. The number of data packets in a source block SB may not be more than B~=102 (R/f). If the content is 3 MB large, 372 data packets P (each of 8082 bytes) are used. This means that N=ceil (372/102)=4 (SB) source blocks SB are required. The number of bits that are required to describe the source block is 2. From the above it follows that for a 3 MB file, 9 bits are required in the header of a network coded data packet C.

If the value of f is chosen suitably then all encoded symbols that are transmitted by an eNB will be useful to all UEs that are receiving it. In that sense our solution achieves the potential of Raptor codes at limited complexity (creating encoded symbols in advance and caching these at eNBs). If we assume a loss of most 20% of the packets at the UEs (for instance at cell edges) then it is sufficient to take f=1.25. The value of f is not affecting efficiency at the radio side once it is chosen sufficiently large, but increases the storage requirements needed at the eNB s.

The efficiency of the disclosed method is dependent on the number of cell changes (handovers) of receivers. If there are no mobile receivers, then all eNBs may cache the same set of network coded data packets C. In that case, R=Q and B=Bmax can be used, i.e. larger source blocks can be used and a reduction of the number N of source blocks can be taken. The effects of larger R and smaller N cancel. Therefore, the disclosed method achieves a good performance and provides no additional signaling overhead.

Figure 8:
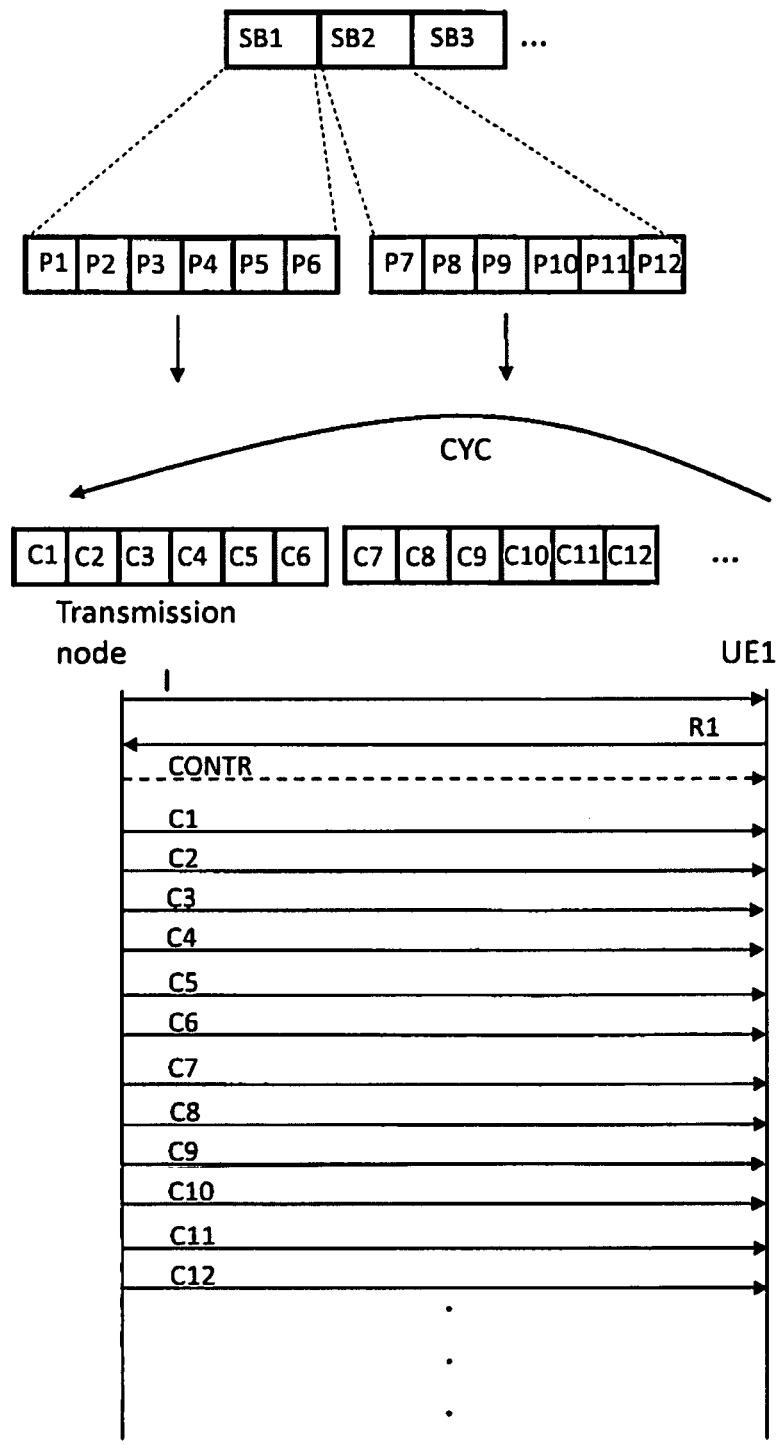
FIG. 8 is a time diagram illustrating transmission of sets of network coded data packets from a transmission node to a receiver in a cell.

FIG. 8 is a time diagram illustrating transmission of sets of network coded data packets C from a transmission node to a receiver UE 1 in a cell, wherein the content is partitioned into source blocks SB1, SB2, SB3, etc.

When UE1 enters the cell of the transmission node, UE1 receives information I from which the physical cell identifier PCID can be derived.

After receiving the request R1 for content, the transmission node optionally transmits control information to the receiver UE1 in the cell. The control information contains information (e.g. the number of source blocks) assisting the receiver UE1 to resolve data packets P1-P6 and P7-P12 from the network coded data packets C1-C6 and C7-C12, respectively.

Each network coded data packet C contains sequence information. The sequence information may comprise the sequence number in the transmission cycle CYC. Note that this sequence number enables the receiver to retrieve a number between 1 and R and a source block number. Together these specify the linear combination of a network coded packet. The sequence information in the network coded data packet may also itself contain information regarding a number between 1 and R as well as an identifier of a source block. Hence, receiver UE1 may resolve data packets P1-P12 of source blocks SB1 and SB2. When the receiver UE1 has received all network coded data packets C, all the data packets P can be resolved and the complete file is available at the receiver UE1.

Figure 9:
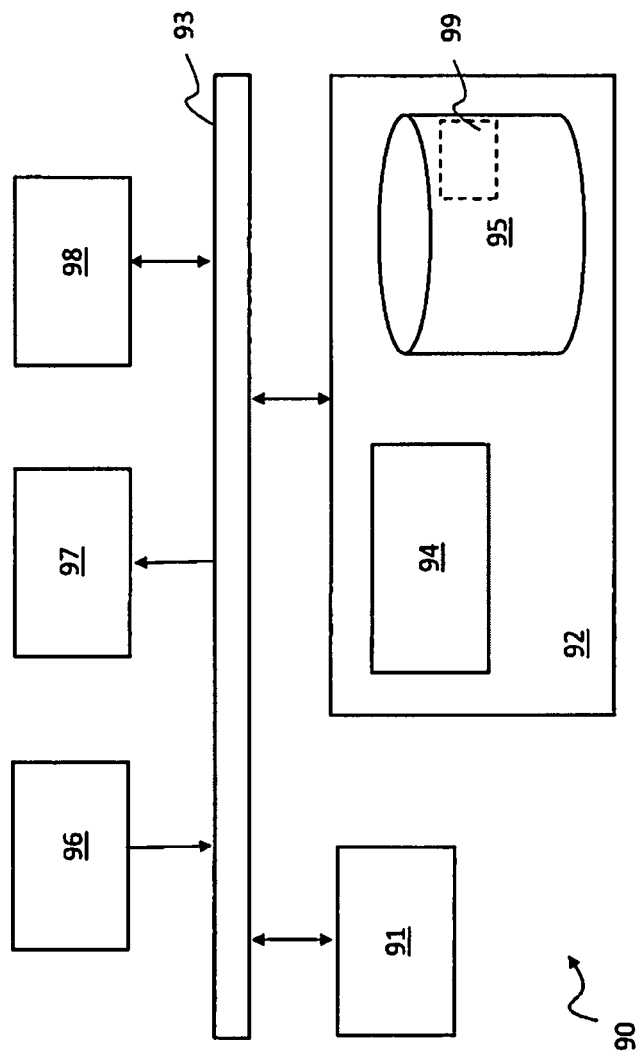
FIG. 9 is a schematic block diagram of a general system (e.g. a transmission node or a receiver) to be employed in the disclosed transmission method.

FIG. 9 is a block diagram illustrating an exemplary data processing system that may be used as a part of a receiver, such as user equipment UE1, UE2, UE3 or as a transmission node 20, such as a base station.

Data processing system 90 may include at least one processor 91 coupled to memory elements 92 through a system bus 93. As such, the data processing system 90 may store program code within memory elements 92. Further, processor 91 may execute the program code accessed from memory elements 92 via system bus 93. In one aspect, data processing system 90 may be implemented as a computer that is suitable for storing and/or executing program code. It should be appreciated, however, that data processing system 90 may be implemented in the form of any system including a processor and memory that is capable of performing the functions described within this specification.

Memory elements 92 may include one or more physical memory devices such as, for example, local memory 94 and one or more bulk storage devices 95. Local memory may refer to random access memory or other non-persistent memory device(s) generally used during actual execution of the program code. A bulk storage device 95 may be implemented as a hard drive or other persistent data storage device. The data processing system 90 may also include one or more cache memories (not shown) that provide temporary storage of at least some program code in order to reduce the number of times program code must be retrieved from bulk storage device 95 during execution.

Input/output (I/O) devices depicted as input device 96 and output device 97 optionally can be coupled to the data processing system 90. Examples of input devices may include, but are not limited to, for example, a keyboard, a pointing device such as a mouse, a touchscreen, or the like. Examples of output device may include, but are not limited to, for example, a monitor or display, speakers, or the like. Input device 96 and/or output device 97 may be coupled to data processing system 90 either directly or through intervening I/O controllers. A network adapter 98 may also be coupled to data processing system 90 to enable it to become coupled to other systems, computer systems, remote network devices, and/or remote storage devices through intervening private or public networks. The network adapter 98 may comprise a data receiver for receiving data that is transmitted by said systems, devices and/or networks to said data processing system 90 and a data transmitter for transmitting data to said systems, devices and/or networks. Modems, cable modems, and Ethernet cards are examples of different types of network adapters that may be used with data processing system 90.

As pictured in FIG. 9, memory elements 92 may store an application 99. It should be appreciated that data processing system 90 may further execute an operating system (not shown) that can facilitate execution of the application. Applications, being implemented in the form of executable program code, can be executed by data processing system 90, e.g., by processor 91. Responsive to executing the application 99, the data processing system 90 may be configured to perform one or more operation as disclosed in the present application in further detail.

In one aspect, for example, data processing system 90 may represent a multipoint transmission control system MTC or a user device UE. In that case, application 99 may represent a client application that, when executed, configures data processing system 90 to perform the various functions described herein with reference to a base station or a user equipment. a base station of a telecommunications network 1 providing cellular wireless access comprise e.g. a NodeB or an eNB. The user equipment can include, but is not limited to, a personal computer, a portable computer, a mobile phone, or the like.

It is noted that the method has been described in terms of steps to be performed, but it is not to be construed that the steps described must be performed in the exact order described and/or one after another. One skilled in the art may envision to change the order of the steps and/or to perform steps in parallel to achieve equivalent technical results.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

While this invention has been particularly shown and described with references to example embodiments thereof, it will be understood by those skilled in the art that various changes in form and details may be made therein without departing from the scope of the invention encompassed by the appended claims.

The invention claimed is:

1. A method for wirelessly providing a number of data packets to a plurality of receivers in a cell of a transmission node of a cellular telecommunications system, the method comprising:
   storing a number of network coded data packets at the transmission node;
   cyclically transmitting the stored network coded data packets from the transmission node to the plurality of receivers;
   wherein a number of transmitted network coded data packets in a cycle is at least equal to the number of data packets to be provided to each receiver of the plurality of receivers and wherein each network coded data packet is a linear combination of two or more data packets to be provided to each receiver.

2. The method according to claim 1, further comprising the step of selecting the two or more data packets for the linear combination of each of the network coded data packet such the linear combination of each network coded data packet is independent from the linear combination of each of the other network coded data packets.

3. The method according to claim 2, further comprising the step of deterministically selecting at least one of (i) the at least two data packets and (ii) the corresponding coding coefficients of each linear combination.

4. The method according to claim 1, wherein the number of cyclically transmitted network coded data packets exceeds the number of data packets to be provided to the plurality of receivers.

5. The method according to claim 4, wherein the number of transmitted data packets in a cycle exceeds the number of data packets by a quantity related to a data loss probability in the cell.

6. The method according to claim 1, wherein the cellular telecommunications system comprises a first cell and a second cell, the method comprising:
   storing a first set comprising a number of network coded data packets for the first cell;
   cyclically transmitting the stored network coded data packets of the first set to a plurality of receivers in the first cell;
   storing a second set comprising a number of network coded data packets for the second cell;
   cyclically transmitting the stored network coded data packets of the second set to a plurality of receivers in the second cell;
   wherein at least one of the network coded data packets of the first set is different from each of the network coded data packets of the second set.

7. The method according to claim 6, wherein the first set and the second set are disjoint sets of network coded data packets.

8. The method according to claim 6, wherein the first cell is associated with a first cell identifier and the second cell is associated with a second cell identifier, different from the first cell identifier, the method further comprising the step of generating the network coded data packets of the first set using the first cell identifier and generating the network coded data packets of the second set using the second cell identifier.

9. The method according to claim 8, wherein the first cell identifier and the second cell identifier are physical cell identifiers.

10. The method according to claim 1, wherein each cyclically transmitted network coded data packet comprises signaling information containing sequence information.

11. A transmission node for wirelessly providing a number of data packets to a plurality of receivers in a cell of a cellular communications network, the transmission node comprising:
    storage means storing a number of network coded data packets at the transmission node;
    processing means configured for cyclically transmitting the stored network coded data packets to the plurality of receivers;
    wherein the number of transmitted network coded data packets in a cycle is at least equal to the number of data packets to be provided to each receiver of the plurality of receivers and wherein each network coded data packet is a linear combination of two or more data packets to be provided to each receiver.

12. The transmission node according to claim 11, wherein the transmission node is further configured for performing the method according to claim 2.

13. A telecommunications network comprising a first transmission node according to claim 11 defining a first cell and a second transmission node according to claim 11 defining a second cell wherein the first transmission node stores a first set comprising a number of network coded data packets for the first cell and is configured for cyclically transmitting the stored network coded data packets of the first set to a plurality of receivers in the first cell;
    wherein the second transmission node stores a second set comprising a number of network coded data packets for the second cell and is configured for cyclically transmitting the stored network coded data packets of the second set to a plurality of receivers in the second cell;
    wherein at least one of the network coded data packets of the first set is different from each of the network coded data packets of the second set.

14. The telecommunications network according to claim 13, wherein the first cell is associated with a first cell identifier, and the second cell is associated with a second cell identifier, different from the first cell identifier, wherein the stored network coded data packets of the first set have been generated using the first cell identifier and the stored network coded data packets of the second set have been generated using the second cell identifier.

15. The telecommunications network according to claim 13, wherein the first transmission node and the second transmission node are each configured to transmit signaling information with the cyclically transmitted network coded data packets containing a sequence number indicating a location in a cycle determining the cyclical transmission of the network coded data packets.

16. A receiver configured for receiving a network coded data packet from a transmission node, wherein the network coded data packet comprises a linear combination of at least to or more data packets to be provided to the receiver, wherein the receiver comprises a processor configured to:
    obtain a cell identifier of a cell of the transmission node;
    obtain sequence information, of a network coded data packet in a cycle of network coded data packets; and
    determine the linear combination of the two or more data packets using the cell identifier and the sequence information.

17. A computer program or suite of computer programs comprising at least one software code portion or a computer program product storing at least one software code portion, implemented on a computer-readable non-transitory storage medium, the software code portion, when run on a computer system, being configured for executing the method according to claim 1.

* * * * *